United States Patent
Ahuja et al.

(10) Patent No.: US 11,616,859 B2
(45) Date of Patent: Mar. 28, 2023

(54) UNIFIED COUNTING PLATFORM

(71) Applicant: Microsoft Technology Licensing, LLC, Redmond, WA (US)

(72) Inventors: Bhavneet Singh Ahuja, Bengaluru (IN); Arun Chauhan, Bangalore (IN); Tejas Rajamohan, Bangalore (IN); Shaik Zakir Hussain, Bengaluru (IN); Sachin Kakkar, Bengaluru (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 472 days.

(21) Appl. No.: 16/836,591

(22) Filed: Mar. 31, 2020

(65) Prior Publication Data

US 2021/0306440 A1    Sep. 30, 2021

(51) Int. Cl.
*H04L 67/60* (2022.01)
*H04L 67/75* (2022.01)

(52) U.S. Cl.
CPC .............. *H04L 67/60* (2022.05); *H04L 67/75* (2022.05)

(58) Field of Classification Search
CPC ....... H04L 67/60; H04L 67/75; H04L 67/566; H04L 67/02
See application file for complete search history.

(56) References Cited

U.S. PATENT DOCUMENTS

| | | | |
|---|---|---|---|
| 6,792,392 B1* | 9/2004 | Knight | G06F 11/3466 702/182 |
| 8,566,907 B2* | 10/2013 | Choti | H04L 63/10 713/172 |
| 2013/0276070 A1* | 10/2013 | Lee | G06F 21/45 726/4 |
| 2017/0118304 A1* | 4/2017 | Ratiu | H04L 67/53 |
| 2018/0139294 A1* | 5/2018 | Ju | G06Q 50/01 |
| 2018/0152366 A1* | 5/2018 | Cornett | H01R 13/631 |

* cited by examiner

*Primary Examiner* — Javier O Guzman
(74) *Attorney, Agent, or Firm* — NDWE, LLP

(57) ABSTRACT

The disclosed embodiments provide a system for managing a counting use case. During operation, the system matches, to a first counting use case, a first parameter of a first unified request over an application programming interface (API) provided by a unified counting platform. Next, the system identifies, based on metadata for configuring the first counting use case in the unified counting platform, a first counting solution assigned to the first counting use case. The system then formats a first set of parameters in the first unified request into a first adapted request that is transmitted to the first counting solution. The system also formats a first response to the first adapted request from the first counting solution into a first unified response to the first unified request. Finally, the system transmits the first unified response to a first source of the first unified request.

20 Claims, 7 Drawing Sheets

UNIFIED COUNTING PLATFORM

BACKGROUND

Field

The disclosed embodiments relate to counting solutions for use in online or distributed systems. More specifically, the disclosed embodiments relate to a unified counting platform for orchestrating the use of multiple counting solutions with various types of counting use cases.

Related Art

Counters are used extensively by modern hardware, software, and/or distributed systems. For example, an online system may count the number of login attempts from a particular Internet Protocol (IP) address so that attempts past a certain numeric threshold can be throttled or otherwise addressed. In another example, counters are used to track the numbers of impressions, clicks, shares, comments, or other types of action on a piece of content in an online system to improve user engagement with the content and/or select the content for recommendation to users of the online system. In a third example, the number of machines assigned to a given service in a data center is counted for capacity planning purposes.

On the other hand, existing counting solutions vary in features and functionality, which precludes the use of a single solution with various types of counting-related use cases encountered by a complex system. For example, counting solutions may support different numbers of queries per second (QPS), data volumes, data retention times, and/or levels of synchronization across geographic locations (e.g., data centers, colocation centers, etc.). A first counting use case involving capacity planning for services in a data center may involve low data volumes and QPS, high retention times (e.g., 3-5 years), and high levels of synchronization across locations. Conversely, a second counting use case that involves tracking and throttling daily notifications to users of a service may involve high data volumes and QPS and low retention times (e.g., 24 hours). Thus, a counting solution that meets the requirements of some types of counting use cases may not be suitable for other types of counting use cases.

Consequently, implementation of counting use cases within complex systems may be improved by increasing the availability and/or usability of counting solutions for various counting use cases.

BRIEF DESCRIPTION OF THE FIGURES

In the figures, like reference numerals refer to the same figure elements.

DETAILED DESCRIPTION

Figure 1:
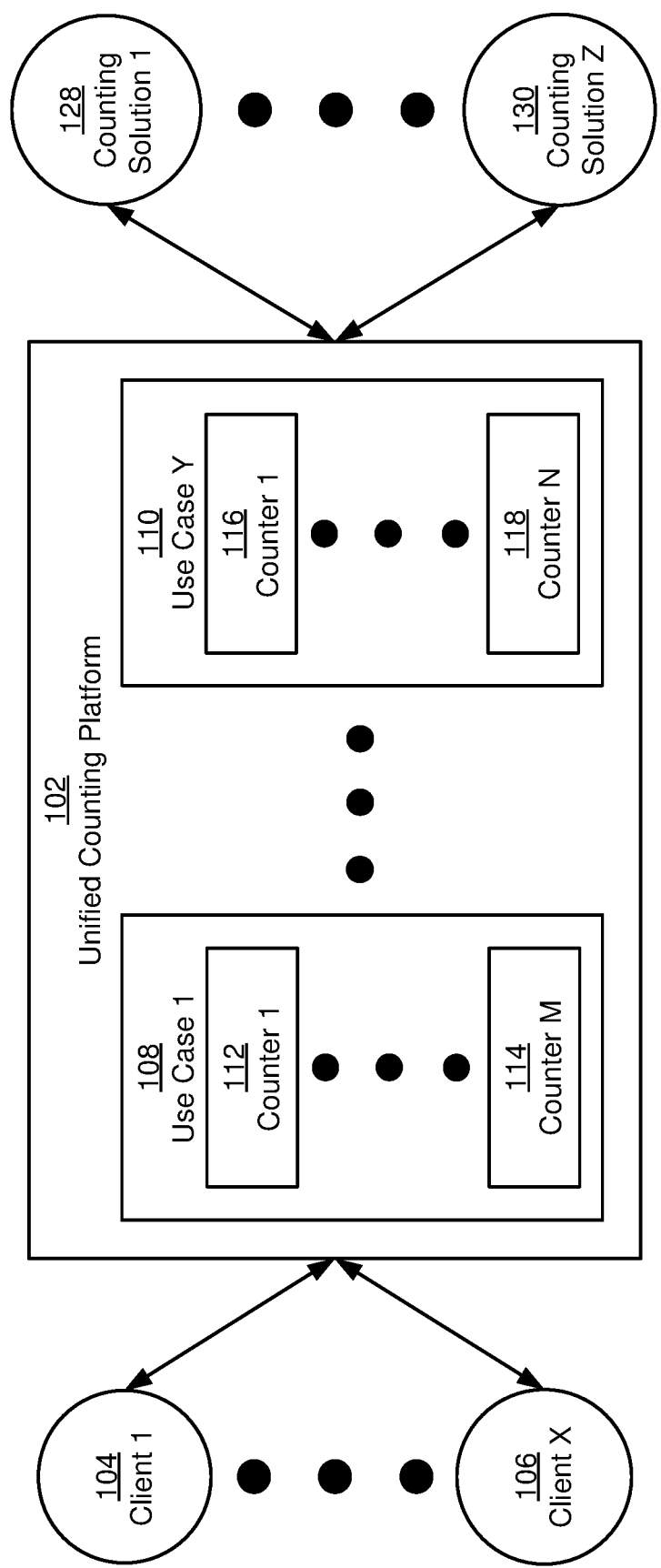
FIG. 1 shows a schematic of a system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The disclosed embodiments provide a method, apparatus, and system for managing and implementing counting use cases. In some embodiments, a counting use case includes a context and/or one or more operations for counting and/or limiting actions, events, and/or other types of occurrences or instances within an online or distributed system. For example, counting use cases encountered within an online system may include, but are not limited to, tracking and/or throttling login attempts, notifications, requests to services within the online system, and/or allocation of resources (e.g., machines, processors, memory, network, etc.) to services in the online system. Each counting use case includes a number of counters that count occurrences or instances of the corresponding attributes, as well as optional restrictions that specify thresholds for the counters and/or actions to be taken or triggered when the thresholds are exceeded.

More specifically, the disclosed embodiments provide a unified counting platform for orchestrating, managing, and monitoring the implementation of counting use cases by multiple counting solutions. The counting solutions include hardware and/or software components that store, increment, retrieve, reset, and/or otherwise operate on counters in the counting use cases. Each counting solution supports a different service level related to request volume, data volume, data retention, data consistency, and/or other factors that affect the storage, retrieval, update, and/or access to counters in the counting solution.

In other words, a counting use case is a user-created set of metadata that defines one or more counters that are created, deleted, incremented, decremented, or otherwise modified for a specific purpose or to achieve a specific goal, while a counting solution includes a standalone hardware and/or software platform that stores instances of each counter in memory and exposes an interface and/or methods for creating, deleting, updating, retrieving, and/or otherwise accessing or manipulating the instances. For example, a counting use case includes a user-defined counter that tracks the number of messages sent by a user of an online system over a certain period (e.g., an hour, day, week, etc.). The counting use case additionally includes a user-defined mapping from unique identifiers for users of the online system to instances of the counter (i.e., each instance of the counter represents a different user and is indexed by the user's identifier). To implement the counting use case, instances of the counter are stored in memory on one or more computer systems on which a counting solution executes. As users of the online system send messages, calls are made to the counting solution to increment and/or return values of the corresponding counter instances.

In one or more embodiments, the unified counting platform provides a number of features and/or abstractions that streamline the use of the counting solutions with the counting use cases. First, the unified counting platform provides a user interface and/or tool that allows clients (e.g., users, teams, administrators, etc.) to create and/or onboard the counting use cases into the unified counting platform. For example, the user interface and/or tool includes elements for creating counters for a given counting use case, mapping keys associated with the counting use case to the counters, specifying one or more periods over which the counters are retained, and/or updating the counters.

During creation of a counting use case, a client is able to specify (e.g., as a part of the metadata for defining the counting use case) requirements of the counting use case to the user interface and/or tool. These requirements include, but are not limited to, an estimated queries per second (QPS), data volume, data retention period, and/or data consistency (e.g., strong or eventual consistency of data replication) of counters in the counting use case. On the other hand, no single counting solution has a set of features or service levels that is able to meet the requirements of all counting use cases.

For example, a first counting solution includes the ability to replicate counters across locations, processes requests with a latency of a few seconds to tens of seconds, is capable of handling thousands of QPS, and supports eventually consistent updates to the counters. A second counting solution supports real-time updates to location-specific counters (i.e., a different set of counters per location), processes requests with a latency in the tens of milliseconds, and supports dozens to hundreds of QPS. The first and second counting solutions may persist counters for a configurable period ranging from one minute to one month. A third counting solution is capable of maintaining counters indefinitely, supports replication of the counters across locations, propagates updates to the counters in a strongly consistent manner, and supports dozens to hundreds of QPS. In other words, the three counting solutions vary significantly in supported QPS, latency, data consistency, data retention, and/or other features, capabilities, or service levels. In turn, requirements of a high QPS and eventual replication of counters in a first counting use case can be met by the first counting solution (but not the second or third), while the requirements of low latency and indefinite retention of counters in a second counting use case can be met by the third counting solution (but not the first or second).

The unified counting platform may identify a counting solution with service levels that best meet the requirements and assign the identified counting solution to the counting use case. If multiple counting solutions have service levels that meet the requirements to the same extent, the client may interact with the user interface and/or tool to select one of the counting solutions for use with the counting use case. After the counting use case is created, the unified counting platform stores metadata that includes an assignment of the counting solution to the counting use case to allow requests related to counters in the counting use case to be directed to the counting solution.

Second, the unified counting platform provides a solution-agnostic application programming interface (API) that can be called by the clients to retrieve, increment, and/or otherwise access or modify counters maintained by the counting solutions. For example, the API may support requests to retrieve, increment, decrement, and/or reset counters in the counting solutions. When a request is received via the API, the unified counting platform matches one or more parameters of the request to metadata for the corresponding counting use case and identifies, from the metadata, the counting solution assigned to the counting use case. The unified counting platform then converts the request into a format that can be processed by the counting solution and transmits the request to the counting solution. When a response to the request is received from the counting solution, the unified counting platform converts the response into a format that is compatible with the API and transmits the converted response to the source of the original request.

Third, the unified counting platform supports restrictions that include thresholds for counters and actions to be performed when the thresholds are exceeded. For example, the unified counting platform provides a tool, API, and/or user interface for defining a threshold for a counter within a counting use case, as well as an action to be performed or returned when the threshold is reached or exceeded. The action may include, but is not limited to, logging the exceeded threshold, generating a warning of the exceeded threshold, and/or dropping a request or action that is tracked by the counter.

By standardizing, unifying, and configuring the use of multiple counting solutions with different types of counting use cases, the unified counting platform provides a centralized environment for addressing a range of counting-based needs or requirements related to QPS, data volume, data retention, data consistency, and/or other service levels that vary across the counting solutions. As a result, the unified counting platform reduces manual configuration and/or computational overhead associated with selecting a counting solution for a given use case, setting up the counting solution to serve the use case, and/or switching to a different counting solution when the requirements of the use case change.

For example, a conventional technique involves users manually selecting a counting solution for a counting use case and setting up counters, restrictions, and/or other elements within the counting solution to support the counting use case. The users may additionally write code to increment, decrement, retrieve, and/or reset the counters within the use case. The process may then be repeated for each additional counting use case and/or whenever an existing counting use case is to be adapted to a new counting solution.

In contrast, the unified counting platform allows users to create and onboard all counting use cases within a centralized user interface and/or tool. In turn, the users are able to define the counting use cases and corresponding requirements, counters, and/or restrictions without interacting with or understanding how to individual counting solutions work. Applications that utilize the counting use cases are additionally able to call a solution-agnostic API provided by the unified counting platform instead of customizing the calls to interfaces that are specific to individual counting solutions. When the requirements of a counting use case change, the unified counting platform can migrate the counting use case to a more suitable counting solution without requiring users to manually set up the counting use case with the new counting solution, thereby reducing the likelihood of errors and/or resource consumption in processing requests from the users by the counting solutions. Consequently, the disclosed embodiments improve computer systems, applications, user experiences, tools, and/or technologies related to creating, storing, updating, and/or taking action on counters.

Unified Counting Platform

FIG. 1 shows a schematic of a system in accordance with the disclosed embodiments. The system includes a unified counting platform 102 that manages and/or orchestrates the use of multiple counting solutions (e.g., counting solution 1 128, counting solution z 130) with counting use cases (e.g., use case 1 108, use case y 110) specified by a number of clients (e.g., client 1 104, client x 106).

In some embodiments, counting use cases include processes, workflows, entities, and/or outcomes that involve counters. As shown in FIG. 1, use case 1 108 includes one set of counters (e.g., counter 1 112, counter m 114), and use case y 110 includes a different set of counters (e.g., counter 1 116, counter n 118). Each counter may be used to count and/or track the number of instances or occurrences of a corresponding action, entity, event, and/or attribute. For example, each counter includes a key that uniquely identifies an entity represented by the counter (e.g., a user that performs actions tracked by the counter), as well as a value storing a count or another numeric value representing an attribute associated with the entity (e.g., the number of actions performed by the user).

In turn, counting use cases may utilize counters for a variety of purposes. For example, counting use cases within an online and/or distributed system include counters that track usage or availability of resources (e.g., processor, memory, network, input/output (I/O), machines, etc.) for services in the system. The counting use cases may also, or instead, track numbers of notifications, login attempts, requests, messages, and/or other types of activity associated with users and/or other types of entities (e.g., groups of users, locations, schools, companies, etc.) in the system.

In one or more embodiments, counting use cases are created by the clients via a user interface with unified counting platform 102. Each client includes a user, team, application, project, service, and/or another entity that is capable of interacting with unified counting platform 102. To create a counting use case, a client specifies a name of the counting use case, defines counters that fall under the counting use case, and/or specifies optional restrictions that include thresholds for the counters and/or actions to be performed when the counters cross the thresholds.

Each counting use case created within unified counting platform 102 is then implemented and/or supported by a corresponding counting solution, which provides hardware and/or software components that store, increment, retrieve, reset, and/or otherwise operate on counters in the counting use case. For example, each counting solution may maintain a set of counters for a counting use case created by a client. The counting solution may also provide an application programming interface (API) that can be called by applications or services associated with the client to perform operations on the counters.

Figure 2:
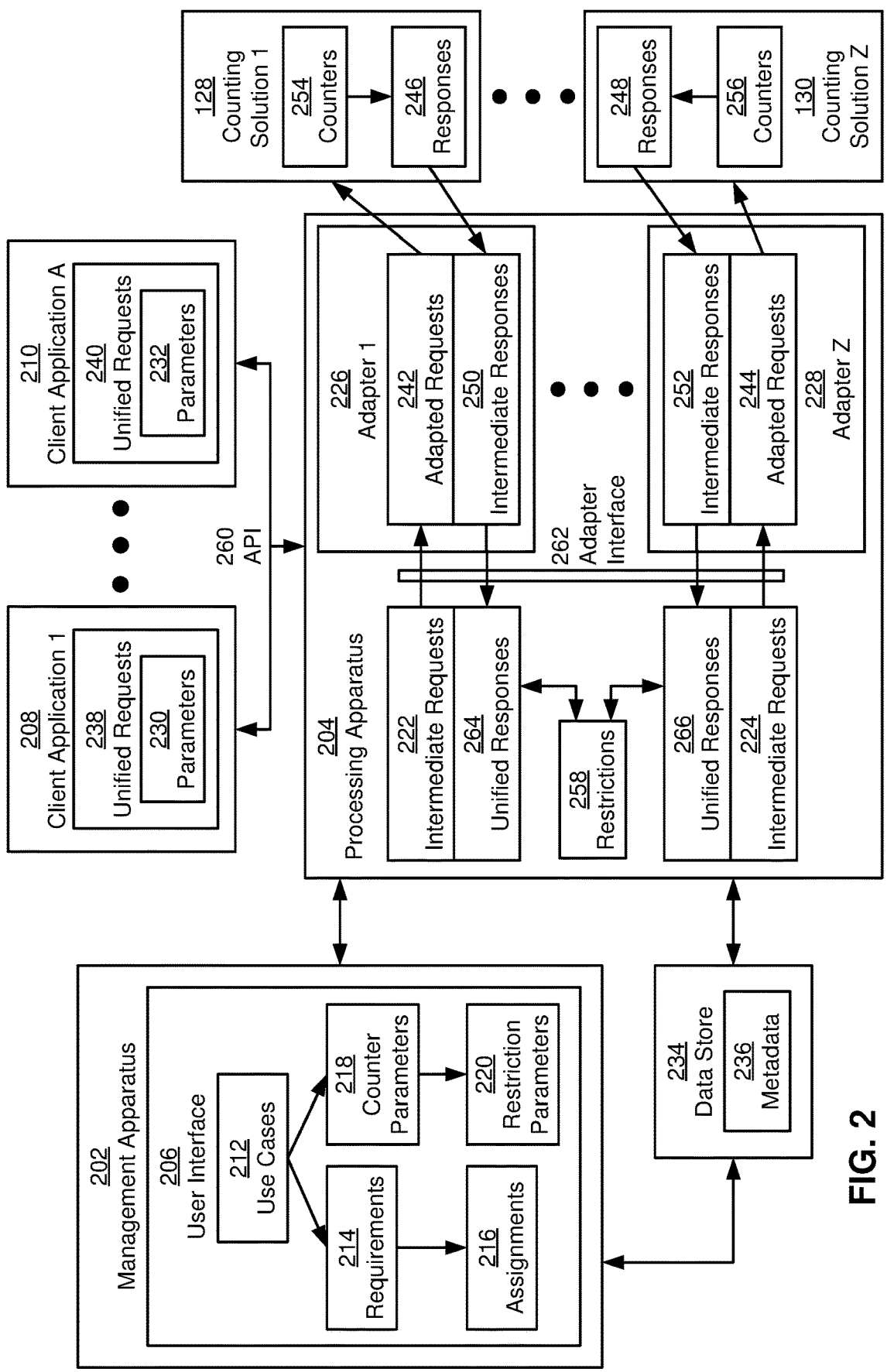
FIG. 2 shows a unified counting platform in accordance with the disclosed embodiments.

In one or more embodiments, unified counting platform 102 provides a centralized environment for managing and orchestrating the implementation of various types of counting use cases on multiple counting solutions. As shown in FIG. 2, a unified counting platform (e.g., unified counting platform 102 of FIG. 1) includes a management apparatus 202 and processing apparatus 204. Each of these components is described in further detail below.

Management apparatus 202 provides a user interface 206 for creating counting use cases 212. For example, user interface 206 includes a graphical user interface (GUI), web-based user interface, command line interface (CLI), voice user interface, and/or another type of interface that allows clients to specify attributes of use cases 212 to be managed within the unified counting platform.

During interaction with user interface 206, each client specifies requirements 214 related to implementation of a corresponding counting use case (e.g., use cases 212). In some embodiments, requirements 214 include values of dimensions representing features, capabilities, and/or levels of performance that are necessary to support or implement the counting use case. For example, requirements 214 include an estimated peak queries per second (QPS), which represents the rate of requests for retrieving, updating, resetting, and/or otherwise accessing counters in the counting use case. Requirements 214 also, or instead, include a data volume to be retained by the counting solution for the counting use case, which can be specified as the estimated number of unique counters in the counting use case. Requirements 214 also, or instead, include a retention period for the data, which may be specified as a number of seconds, minutes, hours, days, months, and/or years over which a given counter in the counting use case is to be maintained before the counter is reset or deleted. Requirements 214 also, or instead, include a consistency of data in the counters, which can be specified as "strong" (i.e., an update to the data is passed to all replicas of the data before the data can be queried) or "eventual" (i.e., an update to the data is eventually propagated to all replicas of the data).

On the other hand, counting solutions (e.g., counting solution 1 128, counting solution z 130) supported by the unified counting platform vary in their actual capabilities, features, and/or service levels with respect to dimensions associated with requirements 214. For example, a first counting solution includes the ability to replicate counters across locations, processes requests with a latency of a few seconds to tens of seconds, is capable of handling thousands of QPS, and supports eventually consistent updates to the counters. A second counting solution supports real-time updates to location-specific counters (i.e., a different set of counters per location), processes requests with a latency in the tens of milliseconds, and supports dozens to hundreds of QPS. The first and second counting solutions may persist counters for a configurable period ranging from one minute to one month. A third counting solution is capable of maintaining counters indefinitely, supports replication of the counters across locations, propagates updates to the counters in a strongly consistent manner, and supports dozens to hundreds of QPS. In other words, the three counting solutions vary significantly in supported QPS, latency, data consistency, data retention, and/or other features, capabilities, or service levels. In turn, requirements of a high QPS and eventual replication of counters in a first counting use case can be met by the first counting solution (but not the second or third), while the requirements of low latency and indefinite retention of counters in a second counting use case can be met by the third counting solution (but not the first or second).

In one or more embodiments, management apparatus 202 uses requirements 214 of a given counting use case and the corresponding features of counting solutions supported by the unified counting platform to generate an assignment (e.g., assignments 216) of a counting solution to the counting use case. In particular, management apparatus 202 stores and/or has access to the capabilities of each counting solution with respect to the dimensions associated with requirements 214. Management apparatus 202 compares requirements 214 to the capabilities of the counting solutions and assigns the counting solution with capabilities that are closest to requirements 214 to the counting use case.

For example, management apparatus 202 generates vector representations of requirements 214 and the capabilities of each counting solution and calculates a cosine similarity, Euclidean distance, and/or another measure of vector similarity between the vector representation of requirements 214 and the vector representation of each counting solution. Management apparatus 202 then assigns, to the counting use case, the counting solution with the highest measure of similarity to requirements 214. If multiple counting solutions have the same highest similarity to requirements 214, management apparatus 202 outputs the counting solutions within user interface 206, and the client creating the counting use case selects one of the outputted counting solutions for use with the counting use case.

Management apparatus 202 also, or instead, uses a set of costs associated with the counting solutions to assign, to the counting use case, the counting solution with the lowest cost and the highest similarity to requirements 214. The costs may be estimated by management apparatus 202 and/or another component of the system based on QPS, latencies, types of traffic, and/or other factors that affect historical processing of requests by counting solutions. For example, management apparatus 202 calculates the cost of a counting use case using the following formula:

$$f(usecase)=g(usecaseConfigurationMetadata, usecaseOperationMetadata)+h(usecaseOperationMetadata)$$

In the above formula, "f" represents the total cost of the counting use case, "g" represents the cost incurred by the unified counting platform to store metadata 236 for the counting use case and/or process unified requests (e.g., unified requests 238-240) related to the counting use case, and "h" represents the cost incurred by a counting solution in creating, storing, updating, retrieving, deleting, and/or otherwise managing counters in the counting use case. The parameter of "usecaseConfigurationMetadata" represents requirements 214, counter parameters 218, restriction parameters 220, and/or other metadata 236 that defines the counting use case, and the parameter of "usecaseOperationData" represents the estimated load of the counting use case (e.g., in terms of QPS, memory, bandwidth, and/or other resource usage) on the corresponding hardware or software (e.g., the unified counting platform or the counting solution). The formula returns a numeric value representing a dollar amount, aggregate resource usage, and/or another estimated cost or level of overhead associated with implementing the counting use case on the counting solution. The formula may be used to calculate different costs for implementing the counting use case on different counting solutions. The cost of each counting solution may then be combined with the similarity of the counting solution's capabilities to the counting use case's requirements 214 (e.g., using an average or weighted average of the similarity and the inverse of the cost) to obtain an overall score between the counting use case and counting solution. Finally, the counting solution with the highest overall score (e.g., the highest-scoring combination of similarity and inverse cost) is assigned to the counting use case.

User interface 206 also includes user-interface elements that allow the client to specify counter parameters 218 that are used to create and/or configure counters (e.g., counters 254-256) in the counting use case. For example, counter parameters 218 for a given counter include the name of the counter, a description of the counter, one or more keys for the counter (e.g., one or more identifiers (IDs) that define individual instances of the counter), and/or a period over which the counter is incremented or tracked before the counter is deleted or reset (e.g., a number of minutes, hours, days, weeks, months, perpetual, etc.). Counter parameters 218 also, or instead, include optional estimates of peak QPS, the number of distinct keys created within the retention period for the counter, and/or the number of restrictions 258 associated with the counter.

User interface 206 additionally allows the client to specify restriction parameters 220 that define restrictions 258 related to some or all of the counters represented by counter parameters 218. In some embodiments, restrictions 258 include limits on occurrences of attributes tracked by the counters and/or techniques for addressing or enforcing the limits. For example, restriction parameters 220 include a name of a restriction, a description of the restriction, and/or one or more counters to which the restriction applies. Restriction parameters 220 also, or instead, include a threshold for the counter(s) and/or one or more actions to be performed when the threshold is exceeded. The action includes, but is not limited to, logging the exceeded threshold, generating a warning of the exceeded threshold, and/or dropping a request that caused the threshold to be exceeded. User interfaces for creating counting use cases in a unified counting platform are described in further detail below with respect to FIG. 3A.

After a client creates a counting use case via user interface 206, management apparatus 202 stores the attributes of the use case in a data store 234. For example, management apparatus 202 stores metadata 236 that include the use case's name, description, requirements 214, assigned counting solution, counter parameters 218, and/or restriction parameters 220 in one or more records of a database and/or another data storage mechanism. In turn, metadata 236 may be used by processing apparatus 204 and/or other components of the unified counting platform to implement the use case on the counting solution.

More specifically, processing apparatus 204 performs configuration and setup of use cases 212 that have been created via user interface 206 and/or management apparatus 202 with the corresponding counting solutions. For example, processing apparatus 204 obtains metadata 236 for a newly created counting use case from data store 234, management apparatus 202, and/or another component of the system. Processing apparatus 204 uses metadata 236 to generate calls that set up the counting use case, counters (e.g., counters 254-256) in the counting use case, and/or other structures for implementing the counting use case on the counting solution assigned to the counting use case. If the counting use case is to be implemented in multiple locations (e.g., data center, colocation centers, etc.), processing apparatus 204 replicates the calls at each of the locations. Processing apparatus 204 also, or instead, stores metadata 236 and/or restrictions 258 related to the counting use case at each of the locations. After the counting solution is set up to support the counting use case, processing apparatus 204 optionally updates metadata 236 with an indication (e.g., flag, Boolean value, etc.) that setup of the counting use case is complete.

Processing apparatus 204 also implements an API 260 that allows access to counters 254-256 for the counting use cases 212 on the corresponding counting solutions. In some embodiments, API 260 includes methods and/or functions that can be called to retrieve, update, reset, delete, and/or otherwise access or modify counters for a given counting use case on the corresponding counting solution. Because callers of API 260 can use API 260 to access counters 254-256 on any of the counting solutions available under the unified counting platform instead of generating solution-specific calls to the counting solutions, API 260 provides a layer of abstraction for accessing and using the counting solutions.

As shown in FIG. 2, a number of client applications (client application 1 208, client application a 210) issue unified requests 238-240 to API 260 to access counting use cases 212 in the unified counting platform. Each client application is associated with a client (e.g., client 1 104, client x 106 of FIG. 1) of the unified counting platform. For example, each client application includes a database, queuing system, service, and/or another software component that is implemented and/or managed by a corresponding client (e.g., a developer, administrator, and/or user involved in developing or maintaining the client application) of the unified counting platform. In another example, each client application includes an application that is granted access to a counting use case by a client. In turn, each client application utilizes one or more counting use cases 212 created by the client within the unified counting platform.

During execution of a given client application, the client application calls API 260 to access one or more counting use cases 212 associated with the corresponding client. For example, a client application that performs authentication of users with an online system may access a counting use case that tracks, in one or more counters in a corresponding counting solution, the number of login attempts by a given user, IP address, and/or another entity over a pre-specified window of time (e.g., a certain number of minutes, hours, days, etc.). As login attempts are received by the client application, the client application calls API 260 to increment counters for the corresponding entities on the counting solution. The client application then processes the login attempts and/or performs additional actions (e.g., limiting the number of login attempts performed by an entity, requiring additional authentication factors before a login attempt is successful, etc.) based on the values of the counters and/or restrictions 258 associated with the counters.

More specifically, unified requests 238-240 represent requests that adhere to the specification of API 260. For example, each unified request includes a call to one or more routines (e.g., methods, functions, procedures, etc.) in the API. Each unified request includes one or more parameters (e.g., parameters 230-232) that identify a counting use case created within the unified counting platform and/or specify keys for one or more counters (e.g., counters 254-256) in the counting use case. Each unified request also, or instead, includes one or more parameters that specify operations to be applied to the counter(s), such as incrementing, decrementing, resetting, and/or retrieving the identified counters 254-256.

In one or more embodiments, API 260 supports both synchronous requests, which enforce strong consistency in processing of the requests, and asynchronous requests, which are processed in an eventually consistent manner. For example, API 260 includes "UcpRequest" objects storing parameters 230-232 of unified requests 238-240 and "UcpResponse" objects representing unified responses 264-266 that are compatible with API 260 and returned as results of unified requests 238-240. API 260 also includes the following synchronous methods that are processed using representational state transfer (REST) principles:

UcpResponse incrementAndGetCount(UcpRequest)
List<UcpResponse> BatchIncrementAndGetCount(List<UcpRequest>)
UcpResponse getCount(UcpRequest)
List<UcpResponse> getBatchCount(List<UcpRequest>)
void resetCounter(longcounterID)

The first method includes a "UcpRequest" object as a parameter, and increments or decrements one or more counters specified in the "UcpRequest" object (e.g., by updating each counter with a corresponding increment that is a positive or negative number), and returns the counter(s) in a "UcpResponse" object. The second method includes a list of "UcpRequest" objects as a parameter, performs batch processing that increments and retrieves counters specified in the objects, and returns the counters in a list of "UcpResponse" objects. The third method includes a "UcpRequest" object as a parameter, retrieves one or more counters specified in the "UcpRequest" object, and returns the counter(s) in a "UcpResponse" object. The fourth method includes a list of "UcpRequest" objects as a parameter, performs batch retrieval of counters specified in the objects, and returns the counters in a list of "UcpResponse" objects. The fifth method resets (i.e., sets to a value of 0, deletes, etc.) the counter represented by the "longcounterID" parameter and does not return anything.

Continuing with the above example, API 260 includes the following asynchronous methods that are processed using messaging queues:

void postRequest(UcpRequest)
void postBatchRequest(List<UcpRequest>)

The first method passes a "UcpRequest" object for asynchronous processing of the corresponding unified request by processing apparatus 204 and is not required to return anything. The second method passes a list of "UcpRequest" objects for batch processing by processing apparatus 204 and is not required to return anything.

When a unified request (e.g., unified requests 238-240) from a client application is received over API 260, processing apparatus 204 matches one or more parameters (e.g., parameters 230-232) of the unified request to a corresponding counting use case and/or the counting solution used to implement the counting use case. For example, processing apparatus 204 retrieves an ID for the counting use case from a parameter in the unified request and performs a lookup of metadata 236 associated with the ID in data store 234. After metadata 236 for the counting use case is retrieved from data store 234, processing apparatus 204 obtains a name and/or ID for the counting solution from the retrieved metadata 236.

Next, processing apparatus 204 uses metadata 236 for the identified counting use case to convert the unified request into one or more intermediate requests (e.g., intermediate requests 222-224) that identify specific counters, keys for the counters, values of the counters, and/or operations to be performed on the counters in the counting use case. Continuing with the above example, processing apparatus 204 obtains, from metadata 236 for the counting use case, a "rule" that converts one or more IDs and/or other parameters of the unified request into keys for counters in the counting use case. Processing apparatus 204 then uses the rule to format the intermediate request(s) in a way that applies the operation specified in the unified request to the counters.

In one or more embodiments, intermediate requests 222-224 are compatible with a common adapter interface 262 (e.g., API) that is implemented by a set of adapters (e.g., adapter 1 226, adapter z 228) in the unified counting platform. As a result, all intermediate requests 222-224 generated by processing apparatus 204 from unified requests 238-240 can be processed by any of the adapters. In turn, adapter interface 262 allows adapters for various counting solutions to be added, removed, or modified (e.g., to accommodate changes in the corresponding counting solutions) without requiring changes to the operation of processing apparatus 204.

In some embodiments, each adapter that implements adapter interface 262 acts as a bridge between the solution-agnostic API 260 and solution-specific interfaces supported by the counting solutions. In particular, each adapter converts intermediate requests received over adapter interface 262 into one or more adapted requests (e.g., adapted requests 242-244) that can be processed by the corresponding counting solution. For example, the adapter converts each intermediate request into an adapted request that can be sent over a solution-specific interface with the counting solution. The adapter transmits the adapted request(s) to the counting solution, and the counting solution carries out the adapted request(s) by performing one or more operations specified in the adapted request(s) on the corresponding counters (e.g., counters 254-256).

After the operation(s) are complete, the counting solution generates one or more responses (e.g., responses 246-248) to the adapted request(s) and transmits the response(s) to the adapter over the solution-specific interface from which the adapted request(s) were received. The adapter converts the solution-specific response(s) from the counting solution into one or more intermediate responses (e.g., intermediate responses 250-252) that are compatible with adapter interface 262 and transmits the intermediate response(s) over adapter interface 262 to processing apparatus 204. Processing apparatus 204 then converts the intermediate response(s) into a unified response (e.g., unified responses 264-266) that is compatible with API 260 and returns the unified response over API 260 to the counting solution that made the unified request. In some embodiments, the unified response returns counter values and/or other data to the client application from which the unified request was received. Like the unified request, the unified response is generated in a format that adheres to the specification for API 260, which allows the client application to use the data in the unified response without requiring the client application to interface with the counting solution.

In one or more embodiments, processing apparatus 204 includes functionality to apply and/or enforce restrictions 258 on counters 254-256 during the generation of unified responses 264-266 to unified requests 238-240. As mentioned above, restrictions 258 are defined based on restriction parameters 220 that specify thresholds related to counters 254-256, as well as optional actions to be performed or returned when the thresholds are exceeded. During creation of a unified response to a unified request from one or more intermediate responses received from an adapter involved in processing of the unified request, processing apparatus 204 retrieves any restrictions 258 for the counting use case associated with the unified request from metadata 236 for the counting use case. Next, processing apparatus 204 compares values of counters in the intermediate response(s) to thresholds for the counters in the corresponding restrictions 258. If a counter exceeds a corresponding threshold specified in a restriction, processing apparatus 204 adds the action specified in the restriction to the unified response to allow the client application that made the unified request to carry out the action.

For example, restrictions 258 support actions that include, but are not limited to, generating warnings of exceeded thresholds, logging exceeded thresholds, flagging counters that have exceeded thresholds, and/or dropping requests associated with exceeded thresholds. When a counter is determined to have exceeded a threshold in a restriction, processing apparatus 204 adds a representation of the action associated with the restriction (e.g., "NONE," "LOG," "WARN," "FLAG," "DROP," etc.) to a unified response containing the value of the counter before transmitting the unified response over API 260 to the client application.

Processing apparatus 204 also, or instead, includes functionality to trigger actions specified in restrictions 258 when counters associated with restrictions 258 have exceeded the corresponding thresholds. For example, a client can configure one or more restrictions 258 to include calls to executable components when the corresponding threshold(s) are exceeded. The calls may be used to emit events or messages (e.g., over one or more event streams in a distributed streaming platform), invoke callback Uniform Resource Locators (URLs), throw exceptions, and/or perform or trigger other actions on behalf of the client. When a counter exceeds a threshold in a restriction that includes one of these calls, processing apparatus 204 performs the call to carry out the action represented by the call.

The operation of the unified counting platform of FIG. 2 is illustrated using an example counting use case that includes two types of counters:

a first counter tracking the number of content items (e.g., articles, jobs, posts, documents, reports, papers, web pages, etc.) posted by a user a second counter tracking the number of content items posted by a user on behalf of another entity (e.g., a company, school, organization, professional association, group, club, etc.)

A client creates the counting use case by specifying a unique name of "CONTENT" for the counting use case. The client also specifies requirements 214 that include a maximum QPS of 1000 and an estimated 5M unique keys. The client further provides counter parameters 218 that include counter names of "USER_POSTS" and "USER_FROM_ORG_POSTS" for the first and second counters, respectively. The client indicates that the "USER_POSTS" counter name is associated with one key of "USER_ID" and the "USER_FROM_ORG_POSTS" counter name is associated with two keys of "USER_ID" and "COMPANY_ID." Finally, the client specifies restriction parameters 220 that include an action of "WARN" and a threshold of "5" for the first counter. After requirements 214 are specified, management apparatus 202 performs an automatic assignment (e.g., assignments 216) of a counting solution to the counting use case based on requirements 214. Management apparatus 202 also, or instead, provides user-interface elements in user interface 206 that allow the client to override the automatic assignment (e.g., if the client prefers a different counting solution) and/or manually select a counting solution for the counting use case.

During creation of the counting use case, management apparatus 202 creates a rule containing mappings for converting between the keys and the counters. More specifically, management apparatus 202 maps the "USER_ID" key to the first counter and the "USER_ID" and "COMPANY_ID" keys to the second counter. Management apparatus 202 also assigns a unique ID of 1234 to the rule, a unique counter ID of 1001 to the first counter, and a unique counter ID of 1002 to the second counter. The mappings and IDs are stored as metadata 236 for the counting use case, along with the name of "CONTENT" for the counting use case, a name or ID for the counting solution assigned to the counting use case, and/or any restrictions 258 defined by the client for the counting use case.

A subsequent unified request (e.g., unified requests 238-240) from a client application that uses the counting use case includes the following representation:

```
{
    "UcpRequest": {
        "keyAttributes": [
            {
                "name": "USER_ID",
                "value": "54321"
            },
            {
                "name": "COMPANY_ID",
                "value": "123"
            },
        ],
        "requestAttributes": [
            {
                "name": "RULE_ID",
                "value": "1234"
            },
            {
                "name": "INCREMENT_BY",
                "value": "2"
            }
        ],
        "clientID": "CONTENT"
    }
}
```

The above representation includes parameters (e.g., parameters 230-232) named "keyAttributes," "requestAttributes," and "clientID." The "keyAttributes" parameter includes names and values of IDs that are used to generate keys for counters in the counting use case. More specifically, the "keyAttributes" parameter includes a first ID named "USER_ID," which represents a user ID and has a value of "54321." The "keyAttributes" parameters also includes a second ID name "COMPANY_ID," which represents a company ID and has a value of "123."

The "requestAttributes" parameter provides information that is used to process the unified request. This information includes a "RULE_ID" of "1234," which matches the ID assigned to the rule in the counting use case. This information also includes a requested operation of "INCREMENT_BY" and a corresponding value of "2." The "requestAttributes" parameter thus indicates that counters associated with the IDs in "keyAttributes" are to be incremented by 2 according to the rule associated with the counting use case.

Finally, the "clientID" parameter is mapped to a value of "CONTENT," which indicates that the request pertains to the counting use case with the same name After the request is received, processing apparatus 204 matches values of the "RULE_ID" of "1234" and the "clientID" of "CONTENT" to metadata 236 for the counting use case. Processing apparatus 204 uses mappings of operations that can be specified in unified requests 238-240 to methods in adapter interface 262 that can be called to perform the operations to identify a method in adapter interface 262 that matches the "INCREMENT_BY" operation. Such a method includes the following definition:

public Long incrementAndGet(long counterID, long delta, Map<String, String> requestAttributes)

Processing apparatus 204 uses the method definition and the rule in the counting use case to generate the following two intermediate requests (e.g., intermediate requests 222-224) from the initial unified request:

incrementAndGet(1001, 2, {"USER_ID":"54321"})
 incrementAndGet(1002, 2, {"USER_ID":"54321", "COMPANY_ID":"123"})

The first intermediate request includes the counter ID of "1001" for the first counter, a value of "2" by which the value of the first counter is to be incremented, and a key name of "USER_ID" and a key value of "54321" for the first counter. The second intermediate request includes the counter ID of "1002" for the second counter, a value of "2" by which the value of the second counter is to be incremented, and two key names of "USER_ID" and "COMPANY_ID" and respective key values of "54321" and "123" for the second counter. The first intermediate request is thus used to increment the first counter with a key represented by the user ID of "54321" by 2, and the second intermediate request is used to increment the second counter with a key represented by the same user ID and a company ID of "123" by 2.

Processing apparatus 204 retrieves the name of the counting solution assigned to the rule and/or counting use case from metadata 236 and uses an adapter for the counting solution to convert the two intermediate requests into adapted requests (e.g., adapted requests 242-244) that can be processed by the counting solution. In particular, the adapter implements adapter interface 262, which allows the adapter to extract parameters from the intermediate requests that conform to the specification of adapter interface 262. The adapter additionally includes functionality to create, from the extracted parameters, an adapted request that adheres to a separate interface provided by the counting solution, which allows the counting solution to receive the request over the interface and process the adapted request.

For example, the counting solution implements an interface that includes the following method definition:

counterDetail incrementCounter(String key, long delta)

In this example, to carry out the first intermediate request, the adapter generates an adapted request that calls the method with a first parameter of "COUNTER_ID-1001: MEMBER_ID-54321" and a second parameter of "2." To carry out the second intermediate request, the adapter generates an adapted request that calls the method with a first parameter of "COMPANY_ID-123:COUNTER_ID-1002: MEMBER_ID-54321" and a second parameter of "2."

After the counting solution has processed each adapted request, the counting solution returns a response to the adapted request, which includes a "counterDetail" object that contains a value of the counter specified in the adapted request. An example "counterDetail" object returned in a response to one of the adapted requests includes the following representation:

```
{
    "counterDetail": [
        {
            "name": "createdAtTimestamp",
            "value": "1573724000"
        },
        {
            "name": "modifiedAtTimestamp",
            "value": "1573728000"
        },
        {
            "name": "count",
            "value": "5"
        }
    ]
}
```

The above representation includes three name-value pairs. The first name-value pair includes a name of "createdAtTimestamp" and a value of "1573724000," the second name-value pair includes a name of "modifiedAtTimestamp" and a value of "1573728000," and the third name-value pair includes a name of "count" and a value of "5." The first name-value pair thus provides a timestamp at which the counter was created, the second name-value pair provides a timestamp at which the counter was updated (e.g., during processing of the corresponding adapted request), and the third name-value pair provides the value of the counter after the update is made.

The adapter extracts the value of "5" from the "count" attribute in the response and returns the extracted value to processing apparatus 204 in an intermediate response via interface 262. The adapter also repeats the process for the response to the other adapted request.

In turn, processing apparatus 204 may combine the two intermediate responses to the two intermediate requests into a single unified response with the following representation:

```
{
    "UcpResponse": {
        "countersData": [
            {
                "counterID": "1001",
                "counter": {
                    "value": "5",
                    "tieredRestriction": "WARN"
                }
            },
            {
                "counterID": "1002",
                "counter": {
                    "value": "5",
                }
            },
        ]
    }
}
```

The unified response includes a "countersData" field that includes the counter IDs of "1001" and "1002" for the first and second counters and the user and company IDs specified in the unified request. Each counter ID is followed by a "counter" field that provides information related to the corresponding counter. The "counter" field for the first counter with the counter ID of "1001" includes a counter value of 5 and an optional "tieredRestriction" (e.g., after the client or client application opt in to receiving restrictions 258 from processing apparatus 204) that specifies an action of "WARN." The "counter" field for the second counter with the counter of "1002" includes the same counter value of 5 and lacks a "tieredRestriction" field. As a result, the unified response may indicate that a warning is to be generated for the value of the first counter (e.g., because the value exceeds a threshold in a restriction for the first counter), and that no action needs to be performed based on the value of the second counter. After the unified response is generated, processing apparatus 204 transmits the unified response over API 260 to the client application.

In one or more embodiments, management apparatus 202, user interface 206, processing apparatus 204, and/or another component of the system include functionality to generate visualizations of restrictions 258 for various components of the client applications and/or a distributed system that includes the client applications. For example, the distributed system includes an online system that provides a set of features to a number of users. The features include, but are not limited to, a messaging service, content feed, educational content, connections among users, groups of users, and/or profiles for the users. The features are implemented by services, some or all of which are client applications of the unified counting platform. To streamline the management of restrictions 258 by clients associated with the client applications, the component generates a visualization that includes a graph of the services. The graph includes a set of nodes representing the services, as well as directed edges between pairs of nodes representing relationships between the corresponding services (e.g., an edge from a first node to a second node indicates that a first service represented by the first node calls, includes, or depends on a second service represented by the second node). A given node is annotated and/or displayed with a list of restrictions related to processing performed by the node. The list of restrictions may optionally be grouped or filtered by different restriction types, such as "product" or "abuse protection." Visualizations of restrictions related to components of systems are described in further detail below with respect to FIG. 3B.

Continuing with the above example, the component may also generate other types of visualizations related to the existence or use of restrictions 258 within the online system. The visualizations include a diagram of a request lifecycle, which includes a series of requests that are executed to carry out a task (e.g., load a page, generate a set of search results, generate a set of recommendations, etc.). The diagram includes nodes representing restrictions 258, which are grouped under the corresponding requests in the request lifecycle. The diagram also includes arrows that indicate the order in which the requests are made in the request lifecycle. Within the diagram, a node representing a restriction is color-coded with a first color if all counters associated with the corresponding request do not trigger any restrictions 258 and with a second color if one or more counters associated with the request trigger one or more restrictions (e.g., by exceeding the thresholds in the restriction(s)). As a result, the diagram may be used to differentiate between portions of the request lifecycle that fall below thresholds in the corresponding restrictions 258 and portions of the request lifecycle that exceed thresholds in the corresponding restrictions 258.

The visualizations also, or instead, include a graph that shows a hierarchy of categories and/or sub-categories of restrictions 258 in the online system. The root node of the graph represents all restrictions 258, a first set of nodes that are children of the root node represents different categories of restrictions 258 (e.g., abuse protection, product, etc.), and a second set of nodes that are children of the first layer of nodes represents components of the online system to which restrictions 258 apply (e.g., edge servers, application servers, storage, etc.). A given node in the second set of nodes is annotated with a set of restrictions that fall under the node. As a result, the graph can be used to identify the groupings of restrictions 258 under the restriction types, as well as components affected by restrictions 258 of each restriction type.

By standardizing, unifying, and configuring the use of multiple counting solutions with different types of counting use cases, the unified counting platform provides a centralized environment for addressing a range of counting-based needs or requirements. As a result, the unified counting platform reduces manual configuration and/or computational overhead associated with selecting a counting solution for a given use case, setting up the counting solution to serve the use case, and/or switching to a different counting solution when the requirements of the use case change. Consequently, the unified counting solution solves the technical problem of creating, storing, updating, and/or taking action on counters in counting use cases with varying technical requirements.

Those skilled in the art will appreciate that the system of FIG. 2 may be implemented in a variety of ways. First, management apparatus 202, processing apparatus 204, data store 234, and/or the counting solutions may be provided by a single physical machine, multiple computer systems, one or more virtual machines, a grid, one or more clusters, one or more databases, one or more filesystems, and/or a cloud computing system. Management apparatus 202 and processing apparatus 204 may be implemented together and/or separately by one or more hardware and/or software components and/or layers.

For example, the unified counting platform may support a "single machine" counting mode, in which management apparatus 202, processing apparatus 204, and one or more counting solutions run on a physical and/or virtual machine and maintains counters in memory within that machine. This allows each machine to provide an abstraction that supports multiple counting solutions without requiring the machine to make external network calls (e.g., to other machines providing the counting solutions and/or other components of the unified counting platform). In turn, this "single machine" counting mode can be used with counting use cases 212 that specify per-machine limits to the number of calls, counters, restrictions, or other types of data or processing supported by the system. In another example, the unified counting platform supports the "single machine" mode on individual machines within a collection of resources (e.g., a cluster or data center) but also performs network calls among the machines to aggregate the retrieval and/or update of counters in response to certain unified requests 238-240. In a third example, one or more instances of management apparatus 202, processing apparatus 204, data store 234, and/or the counting solutions are distributed across machines in a collection of resources. As a result, management apparatus 202 and processing apparatus 204 use network calls to interface with one another, data store 234, the counting solutions, and/or the client applications.

Second, the system may be adapted to different types and/or numbers of counting solutions, counting use cases, clients, and/or client applications. For example, the unified counting platform includes functionality to "onboard" additional counting solutions, which allows clients and/or client applications to utilize the counting solutions without configuring the client applications to directly interface with the counting solutions. In another example, the unified counting platform supports moving of a counting use case from a first counting solution to a second counting solution when the requirements of the counting use case change (e.g., by setting up the counting use case on the second counting solution and deleting the counting use case from the first counting solution).

Figure 3A:
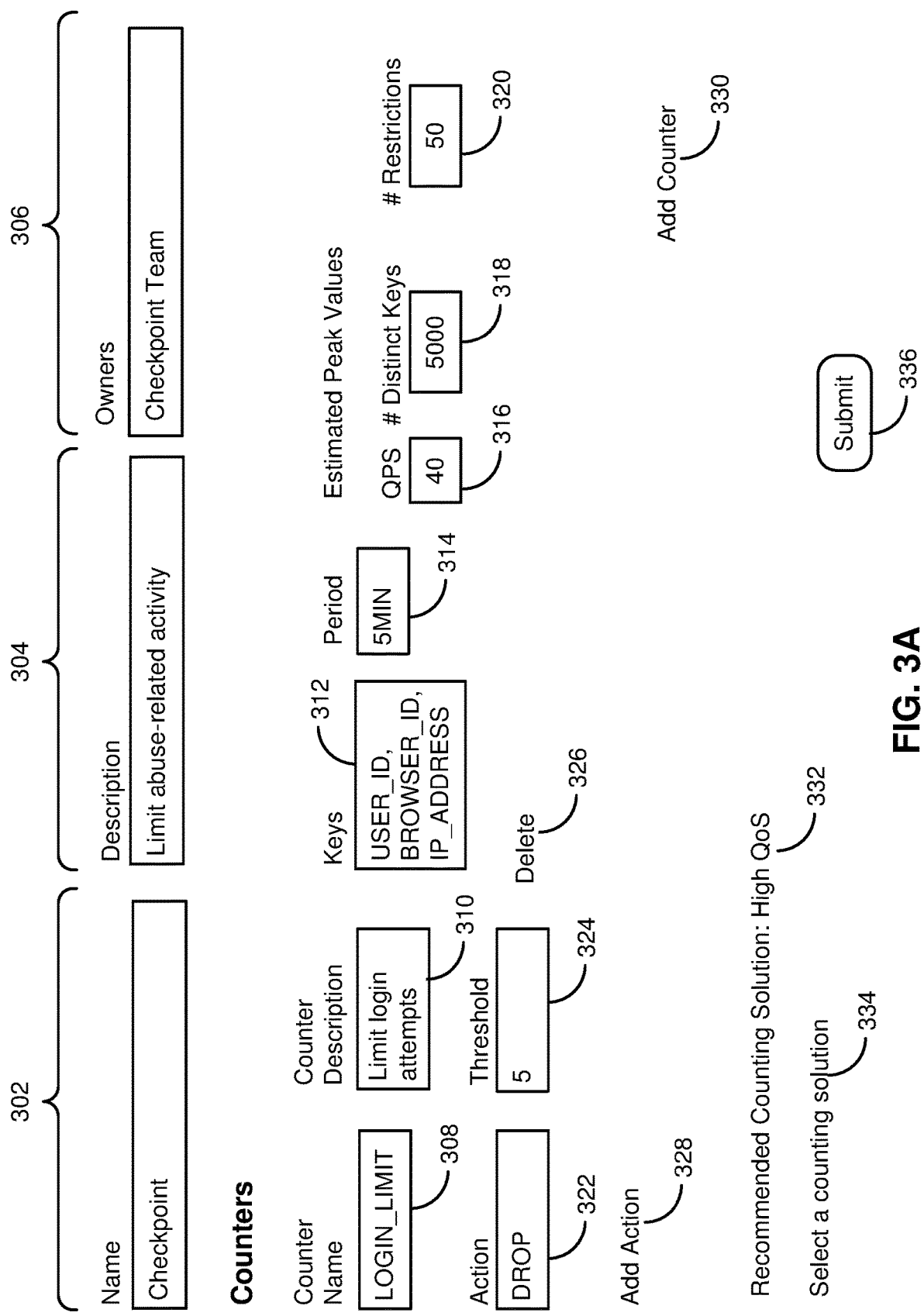
FIG. 3A shows an example screenshot in accordance with the disclosed embodiments.

FIG. 3A shows an example screenshot in accordance with the disclosed embodiments. More specifically, FIG. 3A shows a screenshot of a user interface for creating a counting use case, such as user interface 206 of FIG. 2.

As shown in FIG. 3A, the user interface includes a number of user-interface elements 302-334 for specifying attributes of the counting use case. User-interface element 302 includes a text field that allows a user to input a name (e.g., "Checkpoint") for the counting use case. User-interface element 304 includes a text field that allows the user to input a description (e.g., "Limit abuse-related activity") of the counting use case. User-interface element 306 includes a text field that allows the user to input one or more owners (e.g., "Checkpoint Team") of the counting use case.

User-interface elements 308-330 can be used to create counters and restrictions under the counting use case. User-interface element 308 includes a text field into which a name of a counter (e.g., "LOGIN_LIMIT") is entered. User-interface element 310 includes a text field into which the description of the counter (e.g., "Limit login attempts") is entered. User-interface element 310 includes a text field, drop-down menu, search field, and/or another component that is used to specify one or more keys (e.g., identifiers named "USER_ID," "BROWSER_ID," "IP_ADDRESS") that map to instances of the counter. User-interface element 314 includes a text field, drop-down menu, and/or another component that is used to select a period (e.g., "5 MIN") over which the counter is retained before the counter is reset or deleted.

User-interface elements 316-320 allow the user to specify estimated peak values related to use of the counter. In particular, user-interface element 316 includes a text field into which the estimated peak QPS (e.g., 40) of the counter is entered. User-interface element 318 includes a text field into which the estimated number of distinct keys (e.g., 5000) for the counter is entered. User-interface element 320 includes a text field into which the estimated number of restrictions (e.g., 50) for the counter is entered.

User-interface elements 322-328 are used to define restrictions related to the counter. User-interface element 320 includes a text field, drop-down menu, and/or another component that is used to select an action to be performed in a restriction (e.g., "DROP"), and user-interface element 322 includes a text field that is used to specify a numeric threshold (e.g., 5) against which the counter is compared. When the counter exceeds the threshold, the action is triggered or returned in responses to requests for the counter.

User-interface element 326 may be selected to delete the restriction defined by the values entered into user-interface elements 322-324, and user-interface element 328 may be selected to add a new restriction to the counter. When user-interface element 328 is selected, the user interface may generate user-interface elements that are duplicates of user-interface elements 322-324 under user-interface elements 322-324, and the user may interact with the duplicated user-interface elements to specify an action and threshold for the new restriction.

User-interface element 330 may be selected to add a new counter to the counting use case. When user-interface element 330 is selected, the user interface may generate a new set of user-interface elements that are duplicates of user-interface elements 308-328 under user-interface elements 308-328, and the user may interact with the duplicated user-interface elements to create the new counter.

User-interface element 332 displays a recommended counting solution of "High QoS," which is selected based on the attributes entered in user-interface elements 312-324. For example, a management apparatus (e.g., management apparatus 202 of FIG. 2) may recommend the "High QoS" counting solution for the counting use case because the counting solution has features that support features and/or capabilities specified in user-interface elements 312-324. Alternatively the user may select user-interface element 334 to access an overlay and/or screen in the user interface for manually selecting a counting solution for the counting use case.

After the user has finished specifying attributes of the counting use case, the user may select user-interface element 336 to create the counting use case. In turn, the management apparatus and/or another component store the attributes in metadata for the counting use case and/or perform operations for setting up the counting use case on the counting solution, as discussed above.

Figure 3B:
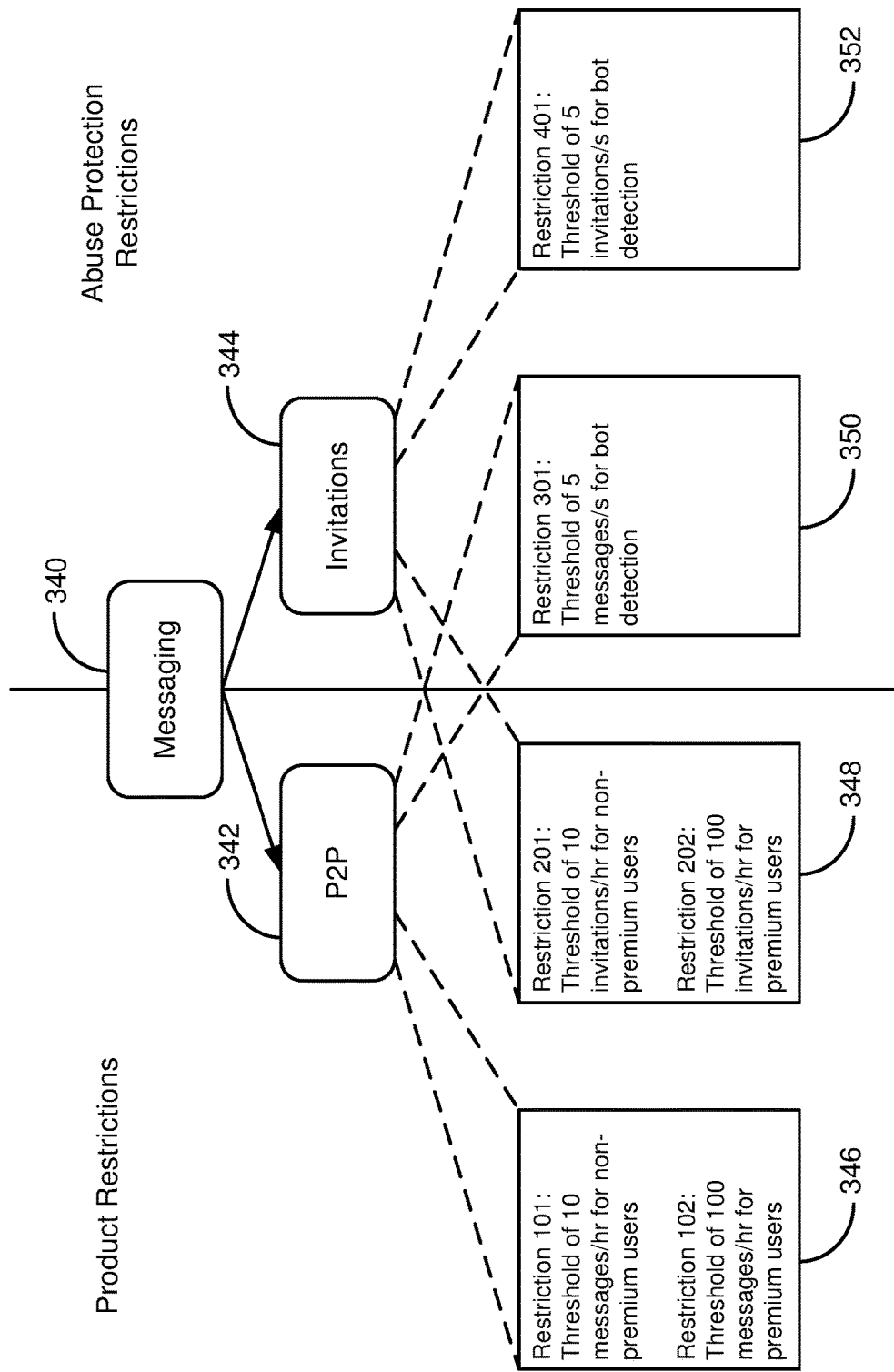
FIG. 3B shows an example screenshot in accordance with the disclosed embodiments.

FIG. 3B shows an example screenshot in accordance with the disclosed embodiments. More specifically, FIG. 3B shows a screenshot of a user interface for displaying a visualization of restrictions (e.g., restrictions 258 of FIG. 2) in the unified counting platform. As mentioned above, the user interface and/or visualization may be generated by management apparatus 202, user interface 206, processing apparatus 204, and/or another component of the system of FIG. 2.

The user interface of FIG. 3B includes a graph of relationships between applications, services, features, and/or other components of a system (e.g., a distributed system, online system, etc.). The graph includes a number of nodes 340-344. The root node 340 represents a messaging component of the system, a first child node 342 of the root node 340 represents a person-to-person messaging component of the system, and a second child node 344 of the root node 340 represents an invitations component of the system. Directed edges from node 340 to nodes 342 and 344 indicate that the messaging component utilizes, calls, depends on, and/or includes the person-to-person messaging component and invitations component.

Nodes 342-344 include annotations 346-352 that display information related to restrictions associated with the corresponding components. As shown in FIG. 3B, the user interface is divided into a "Product Restrictions" side and an "Abuse Protection Restrictions" side. The "Product Restrictions" side includes one annotation 346 for node 342 and one annotation 348 for node 344, and the "Abuse Protection Restrictions" side includes one annotation 350 for node 342 and one annotation 352 for node 344. The positioning of nodes 346 and 348 and nodes 350 and 352 on different sides of the user interface indicate that restrictions listed under nodes 346 and 348 fall under a "Product Restrictions" restriction type and that restrictions listed under nodes 350 and 352 fall under an "Abuse Protection Restrictions" restriction type.

On the "Production Restrictions" side, node 346 includes two restrictions with IDs of 101 and 102, respectively. The first restriction specifies a threshold of 10 messages per hour for non-premium users of the system, and the second restriction specifies a threshold of 100 messages per hour for premium users of the system.

Node 348 includes two restrictions with IDs of 201 and 202, respectively. The first restriction specifies a threshold of 10 invitations per hour for non-premium users of the system, and the second restriction specifies a threshold of 100 invitations per hour for premium users of the system.

On the "Abuse Protection Restrictions" side, node 350 includes one restriction with an ID of 301 that specifies a threshold of 5 messages per second for the purposes of bot detection. Node 352 includes one restriction with an ID of 401 that specifies a threshold of 5 invitations per second for the purposes of bot detection.

Consequently, nodes 340-344 and annotations 346-352 provide a centralized view of components in the system, restrictions related to the components, and categories under which the restrictions are grouped. In turn, clients related to the components can use the visualization to identify restrictions that are currently in place for a given component and restriction type, assess the appropriateness and/or effectiveness of the restrictions for the corresponding purposes (e.g., product, abuse protection, etc.), and/or identify areas in which additional restrictions are needed.

Figure 4:
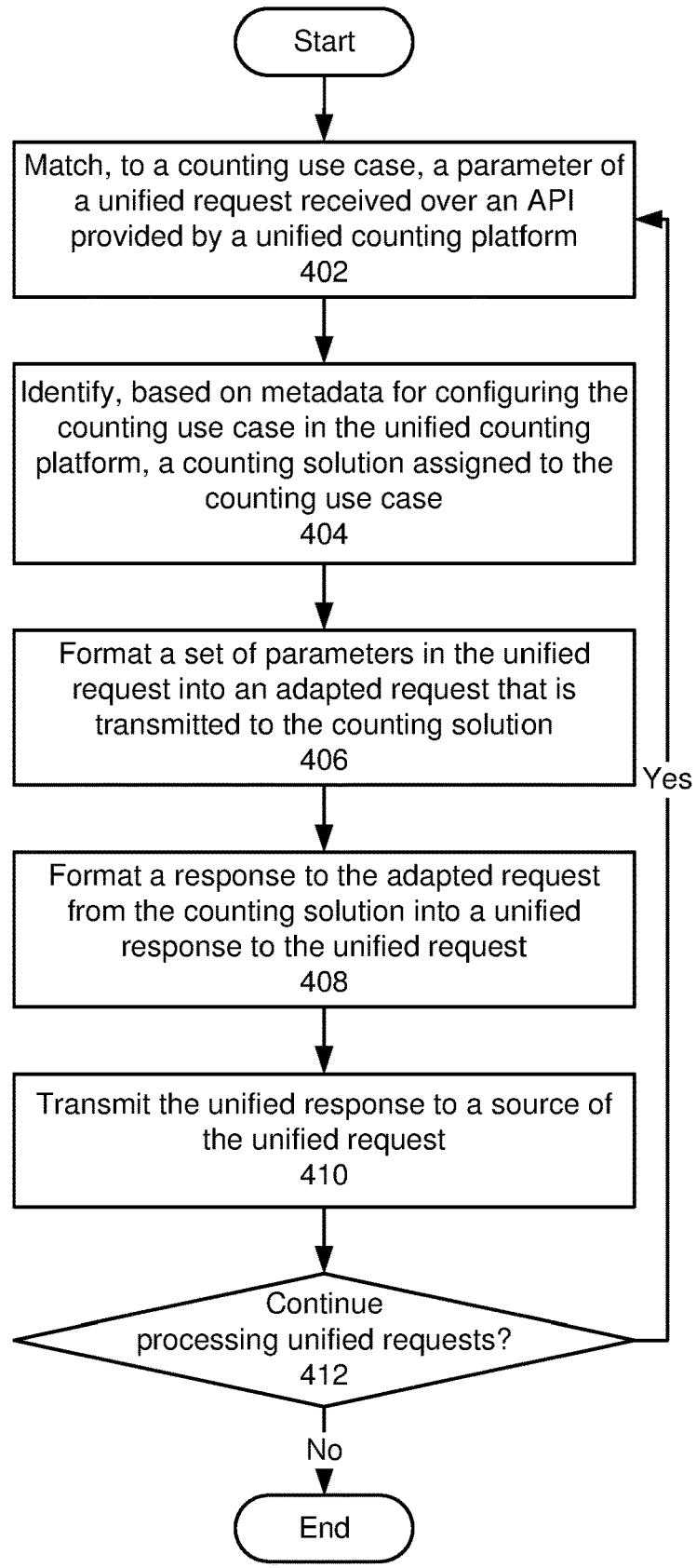
FIG. 4 shows a flowchart illustrating the processing of requests to a unified counting platform in accordance with the disclosed embodiments.

FIG. 4 shows a flowchart illustrating the processing of requests to a unified counting platform in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, a parameter of a unified request received over an API provided by a unified counting platform is matched to a counting use case (operation 402). In some embodiments, the unified request includes a request to the unified counting platform that adheres to the API. As a result, the unified request may be made by a client application to access counting-related functionality provided by the unified counting platform. For example, the parameter includes an ID for the counting use case and/or a client associated with the counting use case. A lookup of one or more data stores is performed using the ID, and metadata for the counting use case is retrieved from the data store(s).

Next, a counting solution assigned to the counting use case is identified based on the metadata (operation 404). For example, the metadata includes a name and/or identifier for the counting solution. The counting solution may be assigned to the counting use case during creation of the counting use case within a user interface, as described in further detail below with respect to FIG. 5.

A set of parameters in the unified request is formatted into an adapted request that is transmitted to the counting solution (operation 406). For example, the unified request includes parameters that specify an operation to be applied to a counter in the counting use case and/or one or more keys for the counter. The key(s) are identified in the parameters based on a rule in the metadata for accessing the counter(s), and an intermediate request that includes the operation on the counter at the key(s) is generated from the unified request. The intermediate request includes a format that adheres to an interface specification for an adapter interface implemented by a set of adapters in the unified counting platform. Each adapter includes functionality to convert intermediate requests received over the adapter interface into adapted requests that are specific to an interface provided by a corresponding counting solution. Thus, a mapping of the counting use case to the counting solution is used to identify an adapter for the counting solution, and the intermediate request is transmitted over the adapter interface to the adapter. The adapter then converts the intermediate request into an adapted request, which adheres to an interface specification implemented by the counting solution.

In some embodiments, the adapted request is transmitted to the counting solution based on a data consistency mode specified in the unified request and/or the counting use case. For example, the unified request and/or counting use case may specify a synchronous mode that enforces strong consistency in the value of the counter, an asynchronous mode that enforces eventual consistency in the value of the counter, and/or a single machine counting mode that executes the unified counting platform and counting solution on a single computer system. When the synchronous mode is specified, the adapted request may be transmitted to the counting solution via a synchronous REST API. When the asynchronous mode is specified, the adapted request may be transmitted to the counting solution via an asynchronous message queue. When the single machine counting mode is specified, a single copy of the counter is stored in memory on the computer system, and enforcement of data consistency is not required.

After a response to the adapted request is received from the counting solution, the response is formatted into a unified response to the unified request (operation 408). For example, one or more values of the counter are extracted from the response and included in the unified response, which adheres to an interface specification for the API over which the unified request was received. If the metadata for the counting use case specifies a restriction for the counter, the values(s) are compared to a threshold in the restriction. When a value of the counter exceeds the threshold, the unified response is updated to include an action specified in the restriction. Alternatively, the action is automatically performed in lieu of or in addition to including the action in the unified response.

Finally, the unified response is transmitted to a source of the unified request (operation 410). For example, the unified response may be transmitted over the API to a client application that made the unified request. In turn, the client application may perform subsequent processing based on the counter value(s) and/or associated actions in the unified response, as discussed above.

Operations 402-410 may be repeated while processing of unified requests continues (operation 412). For example, the unified counting platform may receive unified requests over the API (operation 402), match the unified requests to counting solutions supported by the unified counting platform (operation 404), convert the unified requests into adapted requests that are specific to the counting solutions (operation 406), and convert responses from the counting solutions into unified responses that are transmitted to client applications from which the unified requests were received (operations 408-410) while the unified counting platform is used to orchestrate and/or manage the counting use cases.

Figure 5:
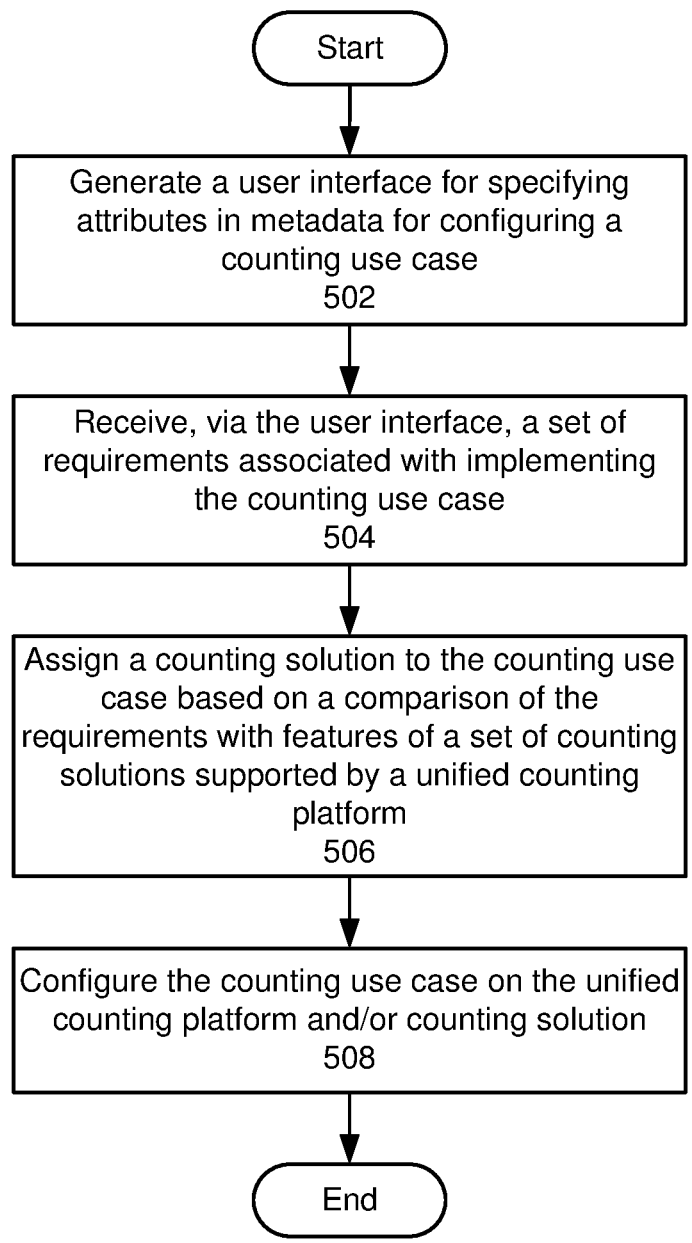
FIG. 5 shows a flowchart illustrating the process of creating a counting use case in a counting platform in accordance with the disclosed embodiments.

FIG. 5 shows a flowchart illustrating the process of creating a counting use case in a unified counting platform in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

First, a user interface for specifying attributes in metadata for configuring the counting use case is generated (operation 502). For example, the user interface includes a GUI, CLI, web-based user interface, voice user interface, and/or another type of interface that receives input from a client of the unified counting platform. The attributes include, but are not limited to, a name and/or description of the counting use case, a name and/or description of each counter in the counting use case, one or more keys in the counter, and/or a period over which the counter is retained. The attributes also, or instead, include one or more restrictions that specify thresholds related to the counter and actions to be performed or triggered when the thresholds are exceeded.

Next, a set of requirements associated with implementing the counting use case is received via the user interface (operation 504). For example, the requirements include, but are not limited to, an estimated peak QPS, data volume (e.g., number of unique keys), one or more periods over which counters in the counting use case are retained, and/or a data consistency associated with the counters.

A counting solution is assigned to the counting use case based on a comparison of the requirements with features of a set of counting solutions supported by a unified counting platform (operation 506). Continuing with the above example, the counting solutions may have features representing different levels of supported QPS, data volumes, retention periods, and/or data consistencies. The counting solution with values of the features that most closely match the requirements may be assigned to the counting use case (e.g., based on an aggregate measure of similarity or distance between the requirements and the features). If more than one counting solution has features that most closely match the requirements, one of the counting solutions is selected for use with the counting use case based on user input via the user interface and/or costs associated with implementing the counting use case on the counting solutions.

Finally, the counting use case is configured on the unified counting platform and/or counting solution (operation 508). For example, the attributes, requirements, counting solution, and/or a unique name or ID for the counting use case are stored under the metadata for the counting use case in a data store. Calls to one or more instances or locations of the counting solution assigned to the counting use case may also be performed to set up counters or other structures that are used to implement the counting use case on the counting solution.

Figure 6:
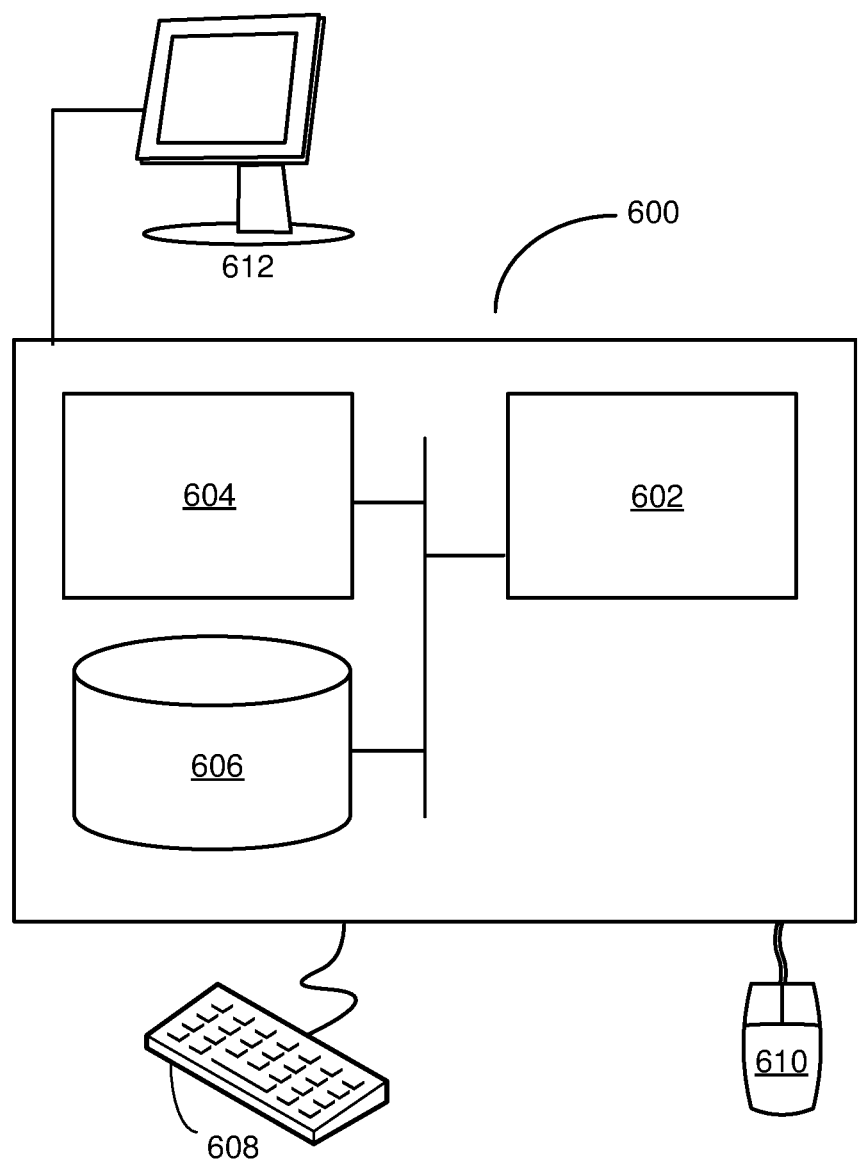
FIG. 6 shows a computer system in accordance with the disclosed embodiments.

FIG. 6 shows a computer system 600 in accordance with the disclosed embodiments. Computer system 600 includes a processor 602, memory 604, storage 606, and/or other components found in electronic computing devices. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, computer system 600 provides a unified counting platform that orchestrates the use of multiple counting solutions with counting use cases. The unified counting platform includes a management apparatus and a processing apparatus, one or more of which may alternatively be termed or implemented as a module, mechanism, or other type of system component. The management apparatus generates a user interface for specifying attributes in metadata for configuring a counting use case. The management apparatus also receives, via the user interface, a set of requirements associated with the counting use case and assigns a first counting solution to the counting use case based on a comparison of the requirements with features of a set of counting solutions supported by the unified counting platform.

The processing apparatus receives a number of unified requests over an API provided by the unified counting platform. The processing apparatus matches a first parameter of each unified request to a corresponding counting use case. Next, the processing apparatus identifies, based on the metadata for the counting use case (e.g., from the management apparatus and/or a data store), a counting solution assigned to the counting use case. The processing apparatus then formats a set of parameters in the unified request into an adapted request that is transmitted to the counting solution, where the adapted request includes a format that is accepted by the counting solution. The system also formats a response to the adapted request from the counting solution into a unified response to the unified request, where the unified response includes a value of a counter in the counting use case from the response and a second format that is compatible with the API. Finally, the system transmits the unified response to a source of the unified request.

In addition, one or more components of computer system 500 may be remotely located and connected to the other components over a network. Portions of the present embodiments (e.g., management apparatus, processing apparatus, data store, counting solutions, client applications, unified counting platform, etc.) may also be located on different nodes of a distributed system that implements the embodiments. For example, the present embodiments may be implemented using a cloud computing system that orchestrates the use of counting use cases associated with a set of remote client applications on a set of remote counting solutions.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core) that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A system, comprising:
a management apparatus configured to:
generate a user interface for specifying metadata for configuring a set of counting use cases;
receive, via the user interface, requirements associated with implementing the set of counting use cases, wherein at least two user-defined counting use cases have differing requirements; and
generate assignments between the set of counting use cases and a set of counting solutions, each of the counting solutions in the set of counting solutions maintaining one or more counters, each of the counting solutions in the set of counting solutions capable of performing an associated counting operation and having associated features, the assignments based on comparisons of the requirements of the set of counting use cases with the features of the set of counting solutions; and
a processing apparatus configured to:
receive a set of unified requests over an application programming interface (API), wherein each of the unified requests comprises an operation to be applied to the one or more counters maintained by one of the counting solutions; and
for each unified request in the set of unified requests:
match a first parameter of the unified request to one of the set of counting use cases, wherein a counting solution has been assigned to the counting use case;
format a set of parameters in the unified request into an adapted request, wherein the adapted request adheres to a first interface specification implemented by the counting solution;
transmit the unified request to the counting solution;
identify a value of a first counter stored on the counting solution, after the counting solution has performed an associated counting operation in response to the unified request;
format a unified response to the unified request, wherein the unified response comprises the value of a first counter stored on the counting solution and wherein the unified response adheres to a second interface specification for the API; and
transmit the unified response to a source of the unified request.

2. The system of claim 1, wherein generating the assignments between the set of counting use cases and the set of counting solutions comprises at least one of:
selecting, for a first counting use case, a first counting solution with values of the features that most closely match a first set of requirements for the first counting use case; and
receiving, via the user interface, a user-specified assignment of a second counting solution to a second counting use case, wherein the second counting solution is selected from a set of candidate counting solutions that most closely match a second set of requirements for the second counting use case.

3. The system of claim 2, wherein the first set of requirements comprises at least one of:
a queries per second (QPS);
a data volume;
a period over which the first counter is retained; and
a data consistency associate with the first counter.

4. The system of claim 1, wherein the metadata comprises:
a name of the counter;
one or more keys for the counter; and
a period over which the counter is retained.

5. The system of claim 4, wherein the metadata further comprises:
a first threshold for the counter; and
a first action to be returned in the unified response when the first threshold is exceeded.

6. The system of claim 5, wherein the metadata further comprises:
a second threshold for the counter; and
a second action to be triggered when the second threshold is exceeded.

7. The system of claim 1, wherein formatting the set of parameters in the unified request into the adapted request comprises:

identifying, in the set of parameters, one or more keys associated with the counter based on a rule in the metadata for accessing the counter;

generating, from the unified request, an intermediate request that performs the operation on the counter at the one or more keys; and converting, by an adapter for the counting solution, the intermediate request into the adapted request.

8. The system of claim 1, wherein the operation comprises at least one of:

retrieving the first counter;

incrementing the first counter;

resetting the first counter; and a batch request related to a set of additional counters maintained by a first counting solution of the set of counting solutions.

9. The system of claim 1, wherein generating the user interface comprises:

generating a first set of user-interface elements for obtaining a name, a description, and one or more owners of the counting use case;

generating a second set of user-interface elements for obtaining a counter name, a counter description, one or more keys, and a retention period for the counter;

generating a third set of user-interface elements for obtaining an estimated QPS, a number of distinct keys, and a number of restrictions for the counter; and generating a fourth set of user-interface elements for obtaining a threshold for a counter and an action related to the threshold.

10. The system of claim 1, wherein the adapted request is transmitted to the counting solution using at least one of:

a synchronous mode that enforces strong consistency in the value of the counter;

an asynchronous mode that enforces eventual consistency in the value of the counter; and a single machine counting mode that executes the processing apparatus and a first counting solution on a single computer system.

11. A method, comprising:

matching, to metadata for defining a first counting use case, a first parameter of a first unified request received over an application programming interface (API) provided by a unified counting platform, wherein the first unified request comprises an operation to be applied to a first counter maintained by a first counting solution;

identifying, based on the metadata, the first counting solution assigned to the first counting use case;

formatting a first set of parameters in the first unified request into a first adapted request that is transmitted to the first counting solution, wherein the first adapted request adheres to a first interface specification implemented by the first counting solution;

formatting a first response to the first adapted request from the first counting solution into a first unified response to the first unified request, wherein the first unified response comprises a value of the first counter from the first response and adheres to a second interface specification for the API; and transmitting the first unified response to a first source of the first unified request.

12. The method of claim 11, further comprising:

matching a second parameter of a second unified request to the API to a second counting solution associated with a second counting use case:

formatting a second set of parameters in the second unified request into a second adapted request that is transmitted to the second counting solution, wherein the second adapted request adheres to a third interface specification implemented by the second counting solution;

formatting a second response to the second adapted request from the second counting solution into a second unified response to the second unified request; and transmitting the second unified response to a second source of the second unified request.

13. The method of claim 11, further comprising:

generating a user interface for specifying the metadata for configuring the first counting use case.

14. The method of claim 13, further comprising:

receiving, via the user interface, a set of requirements associated with implementing the first counting use case; and assigning the first counting solution to the first counting use case based on a comparison of the set of requirements with features of a set of counting solutions supported by the unified counting platform.

15. The method of claim 14, wherein assigning the first counting solution to the first counting use case comprises at least one of:

selecting, for the first counting use case, the first counting solution with values of the features that most closely match the set of requirements; and receiving, via the user interface, a user selection of the first counting solution from a set of candidate counting solutions that most closely match the set of requirements.

16. The method of claim 14, wherein the set of requirements comprises at least one of:

a queries per second (QPS);

a data volume;

a period over which the first counter is retained; and a data consistency associate with the first counter.

17. The method of claim 13, wherein the metadata comprises:

an identifier for the first counting use case;

one or more keys for the first counter; and a period over which the first counter is retained.

18. The method of claim 11, wherein formatting the first set of parameters in the first unified request into the first adapted request comprises:

identifying, in the first set of parameters, one or more keys associated with the first counter based on a rule in the metadata for accessing the first counter;

generating, from the first unified request, an intermediate request that performs the operation on the first counter at the one or more keys; and converting, by an adapter for the first counting solution, the intermediate request into the second unified request.

19. The method of claim 11, wherein formatting the first response into the first unified response comprises:

comparing the value of the first counter in the first response to a threshold for the first counter in the metadata; and when the value exceeds the threshold, generating the first unified response to include an action associated with exceeding the threshold.

20. A system, comprising:

a management apparatus configured to:

generate a user interface for specifying metadata for configuring a set of counting use cases;

receive, via the user interface, requirements associated with implementing the set of counting use cases; and generate assignments between the set of counting use cases and a set of counting solutions based on comparisons of the requirements with features of the set of counting solutions;

means for providing a solution-agnostic application programming interface (API) for receiving unified requests related to the set of counting use cases, wherein each of the unified requests comprises an operation to be applied to one or more counters maintained by a counting solution;

means for formatting, based on the metadata and the assignments, parameters in the unified requests into adapted requests that are transmitted to the counting solutions assigned to corresponding counting use cases, wherein each of the adapted requests comprises a first format that is accepted by a corresponding counting solution;

means for formatting responses to the adapted requests from the counting solutions into unified responses to the unified request, wherein the unified responses comprise counter values from the responses and a second format that is compatible with the solution-agnostic API; and means for transmitting the unified responses to sources of the unified requests.

\* \* \* \* \*